UNITED STATES PATENT OFFICE.

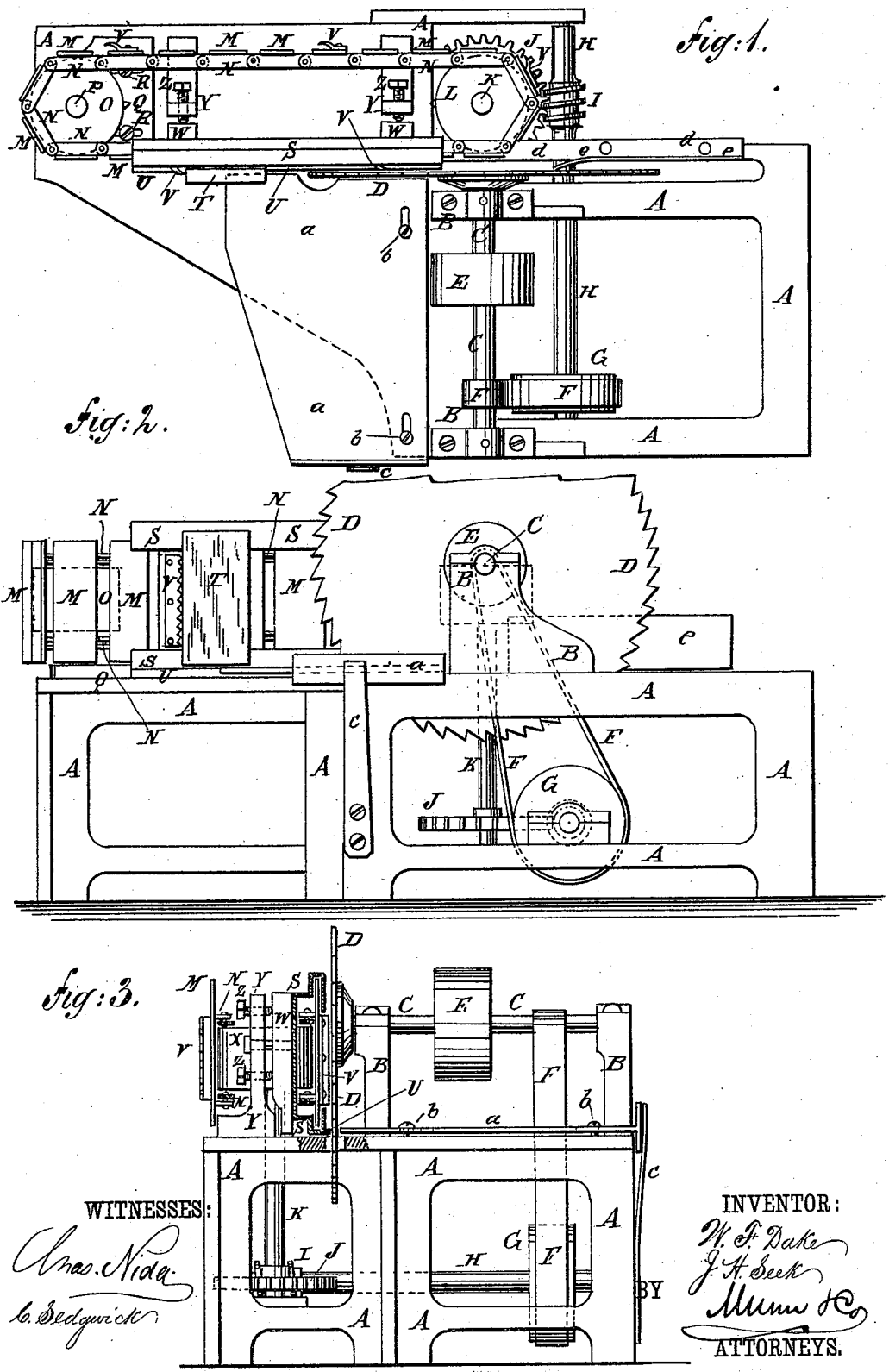

WILLIAM F. DAKE AND JAMES H. SEEK, OF GRAND HAVEN, MICHIGAN.

SHINGLE-SAWING MACHINE.

SPECIFICATION forming part of Letters Patent No. 292,107, dated January 15, 1884.

Application filed July 2, 1883. (No model.)

*To all whom it may concern:*

Be it known that we, WILLIAM F. DAKE and JAMES H. SEEK, of Grand Haven, in the county of Ottawa and State of Michigan, have invented a new and useful Improvement in Shingle-Machines, of which the following is a full, clear, and exact description.

Reference is to be had to the accompanying drawings, forming a part of this specification, in which similar letters of reference indicate corresponding parts in all the figures.

Figure 1 is a plan view of our improvement. Fig. 2 is a side elevation of the same. Fig. 3 is an end elevation of the same, partly in section.

The object of this invention is to facilitate the utilization of saw-mill refuse for the manufacture of shingles.

The invention consists in a shingle-machine constructed with a frame, saw, and saw-mandrel, and an endless chain of bars provided with dogs and driven by chain-drums, a worm and worm-wheel, and a belt and pulley from the saw-mandrel. With the endless chain of bars is connected a recessed, grooved, and flanged plate for keeping the bars of the endless chain in a straight line while passing to the saw. The guide-plate is supported by uprights connected by bolts with supporting-standards, and provided with set-screws, so that a greater or less inclination can be given to the said bars and guide-plate, as the desired taper of the shingles may require. The machine is provided with a movable table, held toward the saw, endless chain of bars, and guide-plate by a spring, so that wedge-pieces and slivers can push back the said table and escape from the machine, as will be hereinafter fully described.

A represents the frame of the machine, to the top of which are attached brackets B, to receive the bearings for the saw-mandrel C.

To one end of the mandrel C is secured the saw D, in the ordinary manner.

To the center of the mandrel C is attached a large pulley, E, to receive the driving-belt.

Around the mandrel C, or a small pulley attached to the said mandrel, passes an endless belt, F, which also passes around a larger pulley, G, attached to the shaft H. The shaft H revolves in bearings secured to the lower part of frame A, and to the said shaft is attached, or upon it is formed, a worm, I, which meshes into the teeth of the worm-wheel J, secured to the lower part of the vertical shaft K. The shaft K revolves in bearings attached to the frame A, and to its upper end, above the said frame, is attached a drum or chain-wheel, L, around which passes an endless chain of upright bars, M. The bars M are hinged to each other by cross-bars or links N, attached to the upper and lower parts of the said bars M, with their ends projecting, so that the ends of the links of adjacent bars will overlap each other and can be connected by pivoting-bolts or rivets. The endless chain of bars M also passes around a drum or chain-wheel, O, pivoted upon a journal, P, formed upon or attached to a plate, Q, resting upon and secured to the frame A. The plate Q is slotted to receive the fastening-bolts R, so that the plate Q and journal P can be readily adjusted to regulate the tension of the endless chain of bars M.

Within the circuit of the endless chain of bars M, and at the side next the saw D, is placed an upright plate, S, which is recessed to receive the hinging-links N, and has grooves in its upper and lower parts, to receive the ends of the bars M and serve as guides to keep the said bars M in an upright position while passing along the said plate, and cause the said bars M to pass to and along the saw D in a straight line. The upper and lower parts of the plate S overlap the outer sides of the upper and lower parts of the bars M, for the blocks T of timber to rest against and slide along while being fed to the saw.

Upon the lower part of the plate S is formed a horizontal flange, U, upon which the inner part of the lower end of the block T rests, and which is made of a width about equal to the thickness of the end of a shingle, so that the said flange can be extended past the saw to support the shingle after being sawed and while being carried past the saw. The block T is held against the saw while being sawed by plates B, secured to the bars M at suitable distances apart. The forward edges of the plate V are toothed to cause them to take hold of the blocks T readily, and project beyond the faces of the bars M less than the thickness of a shingle, so that the said toothed plates or dogs V can pass the saw D.

The guard-plate S is secured to upright bars

W, which are supported at their middle part by bolts X, attached to standards Y, rigidly secured at their lower ends to the frame A. The standards Y, above and below the bolts X, are provided with set-screws Z, the forward ends of which rest against the uprights W, so that by adjusting the said set-screws Z the uprights W, the plate S, and the bars M can be inclined more or less to give more or less taper to the shingles, as may be desired. The outer part of the lower end of the block T rests upon the upper side of the inner edge of the movable table $a$, which rests upon the frame A, and is held from rising by set-screws $b$, which pass through slots in the said table $a$ and screw into the said frame A. The screws $b$ thus limit the outward and inward movement of the table $a$. The table $a$ is held inward by a spring, $c$, attached to the frame A, and resting against the outer edge of the said table. The inner edge of the table $a$ does not extend quite to the flange U, so that wedge-pieces and slivers from the block T can enter the space between the said table and flange, push back the table $a$, and drop from the machine, and will thus be kept from being drawn in against the side of the saw and clogging or heating the said saw.

To the frame A, at the outer side of the rear part of the saw D, is secured a plate, $d$, which forms a continuation of the flange U, and upon the inner edge of which is formed or to it is attached an upwardly-projecting flange, $e$. The forward end of the flange $e$ is inclined toward and terminates close to the side of the rear part of the saw D, so as to serve as a guide to receive the shingles as they pass back along the side of the saw and cause the said shingles to pass out of the machine.

In using the machine the block from which the shingles are to be sawed is placed in an upright position against the plate S and held there until it is forced against the saw by a dog, V. As the shingle is sawed off, the block T falls back from the saw, is reversed by the sawyer, and again placed against the plate S, and so on until sawed up, the shingles being delivered at the rear end of the machine, as hereinbefore described.

We do not abandon or dedicate to the public any patentable features set forth herein and not hereinafter claimed, but reserve the right to claim the same either in a reissue of any patent that may be granted upon this application or in other applications for Letters Patent that we may make.

Having thus described our invention, we claim as new, and desire to secure by Letters Patent—

1. In a shingle-sawing machine, the combination, with the saw-mandrel and its saw, of the shaft having a pulley belted to a pulley on the saw-mandrel, said shaft having also a worm, the vertical shaft having the sprocket-wheels carrying the endless belt of bars, one of said shafts also having a toothed wheel, and the said belt of bars being provided with a dog, and the frame having the flanged guard-plate S V, substantially as and for the purpose set forth.

2. In a shingle-machine, the endless belt of upright cross-bars provided with dogs, in combination with the vertical guard-plate S, having a narrow horizontal flange at its front edge, the table $a$, and the spring adapted to hold the table inward toward the saw, substantially as and for the purpose set forth.

3. In a shingle-sawing machine, the endless belt of upright cross-bars provided with dogs, in combination with the vertical plate S, having its upper and lower portions forming guideways or guards for the belt of cross-bars, and its rear side connected to movable uprights W, and the fixed uprights Y, connected to the latter by bolts X, and having the adjusting-screws Z Z, adapted to act upon the guard-plate uprights W, substantially as and for the purpose set forth.

4. In a shingle-sawing machine, the endless belt of bars M, provided with dogs, in combination with the guard-plate S, with its upper and lower ends adapted to receive and permit the passage through them of the endless belt of bars, its lower end also having a narrow horizontal flange, U, at its forward edge, substantially as and for the purpose set forth.

5. In a shingle-sawing machine, the endless belt of bars M, having dogs V, in combination with the guard or guide plate S, having the narrow horizontal flange U and the rear plate, $d$, forming a continuation of flange U, and having a vertical flange, $e$, with the forward end inclined toward and terminating close to the side of the rear part of the saw, substantially as and for the purpose set forth.

WILLIAM F. DAKE.
JAMES H. SEEK.

Witnesses:
CHARLIE FERGUSON,
JAMES NIBLOCK.